United States Patent
Wei

(10) Patent No.: US 8,729,411 B2
(45) Date of Patent: *May 20, 2014

(54) METHOD OF DETERMINING COORDINATE ON MICRO DOTMAP ACCORDING TO MOVING VECTOR

(71) Applicant: PixArt Imaging Inc., Hsin-Chu (TW)

(72) Inventor: Shou-Te Wei, Hsin-Chu (TW)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/941,557

(22) Filed: Jul. 15, 2013

(65) Prior Publication Data

US 2013/0301087 A1    Nov. 14, 2013

Related U.S. Application Data

(63) Continuation of application No. 12/340,767, filed on Dec. 22, 2008, now Pat. No. 8,513,546.

(30) Foreign Application Priority Data

Jul. 31, 2008    (TW) ................ 97128980 A

(51) Int. Cl.
*G06F 3/041*    (2006.01)
(52) U.S. Cl.
USPC ............. 178/18.01; 178/18.02; 178/18.03; 345/173; 345/178
(58) Field of Classification Search
CPC ... G06F 3/0321; G06F 3/0383; G06F 3/0428; G06F 3/03545; H04N 1/047
USPC ........... 345/32, 173–179, 501, 567, 611, 644, 345/698, 699; 358/1.8, 401; 382/100, 382/232–253; 235/435–486; 178/18.01–18.06

See application file for complete search history.

(56) References Cited

U.S. PATENT DOCUMENTS

| 4,296,930 | A | * | 10/1981 | Frederiksen | ............. | 463/31 |
| 4,331,955 | A | * | 5/1982 | Hansen | ............. | 345/611 |
| 4,736,330 | A | | 4/1988 | Capowski | | |
| 4,760,387 | A | * | 7/1988 | Ishii et al. | ............. | 345/3.1 |
| 4,918,622 | A | * | 4/1990 | Granger et al. | ............. | 345/597 |

(Continued)

FOREIGN PATENT DOCUMENTS

| TW | 200525455 | 8/2005 |
| TW | 200532533 | 10/2005 |

(Continued)

*Primary Examiner* — Prabodh M Dharia
(74) *Attorney, Agent, or Firm* — Winston Hsu; Scott Margo

(57) ABSTRACT

When a user holds an optical scanning device to scan a micro dotmap on a displaying medium, a coordinate of a frame center of a retrieved frame on the displaying medium is calculated according to a decoding method for the micro dotmap in advance. A moving vector corresponding to a difference between difference frames scanned by the optical scanning device at different moments is calculated so that an instant location of the frame center on the displaying medium can be calculated anytime. Therefore, a large number of calculations brought by frequent decoding may be saved since merely a few calculations are required in calculating the moving vector. By further decoding the coordinate of the frame center at moments spaced with constant or variable intervals, errors brought by vibrations of the displaying medium are instantly fixed. Accumulated errors are avoided in the calculated instant locations of the frame center anytime.

23 Claims, 7 Drawing Sheets

(56) References Cited

U.S. PATENT DOCUMENTS

| | | | |
|---|---|---|---|
| 5,113,494 A * | 5/1992 | Menendez et al. | 345/502 |
| 5,691,822 A | 11/1997 | Jones | |
| 5,866,895 A * | 2/1999 | Fukuda et al. | 235/494 |
| 6,072,496 A * | 6/2000 | Guenter et al. | 345/419 |
| 6,111,994 A * | 8/2000 | Katayama et al. | 382/298 |
| 6,548,768 B1 | 4/2003 | Pettersson | |
| 7,123,742 B2 * | 10/2006 | Chang | 382/100 |
| 7,692,625 B2 | 4/2010 | Morrison | |
| 7,697,750 B2 * | 4/2010 | Simmons | 382/154 |
| 7,728,845 B2 * | 6/2010 | Holub | 345/589 |
| 8,005,308 B2 * | 8/2011 | Paniconi et al. | 382/236 |
| 2002/0047822 A1 | 4/2002 | Senda | |
| 2003/0072489 A1 | 4/2003 | Reichenbach | |
| 2005/0134609 A1 * | 6/2005 | Yu | 345/629 |
| 2008/0025612 A1 * | 1/2008 | Wang et al. | 382/188 |
| 2008/0186255 A1 | 8/2008 | Cohen | |
| 2008/0253608 A1 * | 10/2008 | Long et al. | 382/100 |
| 2012/0223140 A1 | 9/2012 | Gomez | |

FOREIGN PATENT DOCUMENTS

| | | |
|---|---|---|
| TW | 200706803 | 2/2007 |
| TW | 200734933 | 9/2007 |
| TW | 200741516 | 11/2007 |

* cited by examiner

METHOD OF DETERMINING COORDINATE ON MICRO DOTMAP ACCORDING TO MOVING VECTOR

CROSS REFERENCE TO RELATED APPLICATIONS

This continuation application claims priority of U.S. Pat. No. 8,513,546 B2 filed on Dec. 22, 2008.

BACKGROUND OF THE INVENTION

1. Field of the Invention

The claimed invention discloses a method of determining a coordinate on a micro dotmap, and more particularly, to a method of determining a coordinate on a micro dotmap according to a moving vector.

2. Description of the Prior Art

Please refer to FIG. 1, which illustrates scanning a displaying medium printed with a micro dotmap by manipulating an optical scanning device in a hand-writing manner so as to display tracks of the optical scanning device on a screen corresponding to a movement of the optical scanning device on the displaying medium. And please refer to FIG. 2, which illustrates a frame retrieved by scanning the displaying medium shown in FIG. 1 with the optical scanning device shown in FIG. 1. As shown in FIG. 1, a displaying medium 104 is printed with a micro dotmap, where microdots printed on the micro dotmap are printed with a particular encoding method. When a user holds an optical scanning device 106 to scan the micro dotmap printed on the displaying medium 104, a frame 120 scanned by the optical scanning device 106 on the displaying medium 104 is transmitted to a screen 102 so as to display a location, which is of the held optical scanning device 106 on the displaying medium 104, on the screen 102. As shown in FIG. 2, the frame 120 scanned in FIG. 1 covers a plurality of encoding blocks 122. Each encoding block 122 is printed with a plurality of microdots 128 having different characteristics, and is separated into a header region 124 and a data region 126. The header region 124 is used for having an encoding block 122 having said header region 124 be recognizable, therefore, as shown in FIG. 2, a combination or a permutation of the plurality of microdots 128 comprised by the header region 124 of each encoding block 122 is the same. The plurality of microdots 128 comprised by each data region 126 are encoded with a particular encoding method so as to indicate a coordinate of an encoding block 122 having said data region 126 on the displaying medium 104, where the encoding method is substantially implemented on the combination or the permutation of the plurality of microdots 128 of each data region 126. As shown in FIG. 2, each encoding block 122 exclusively occupies one particular among the coordinates (x, y), (x+1,y), (x, y+1), and (x+1, y+1), each of which may be retrieved by performing a decoding procedure corresponding to the abovementioned encoding method on the plurality of microdots 128 of the data region 126 of each encoding block 122. When the optical scanning device 106 scans the frame 120, a domain of each scanned encoding block 122 is first recognized according to a data region 124 of each the scanned encoding block 122, then a plurality of microdots 128 in a data region 126 of each the scanned encoding block 122 are decoded so as to determine a coordinate of each the scanned encoding block 122 on the displaying medium 104.

Methods mentioned in FIG. 1 and FIG. 2 are primarily applied on devices such as a Braille plate. A user may hold the optical scanning device 106 to scan and move on the displaying medium 104 so as to correspondingly operate on the screen 102, or to have the screen 102 to serve as a whiteboard by directly displaying movements of the held optical scanning device 106 on the screen 102. The displaying medium 104 is a paper printed with a micro dotmap or a printable medium capable of being printed with the micro dotmap. The optical scanning device 106 may also be a conventional scanning device capable of recognizing microdots on the micro dotmap. When the user holds the optical scanning device 106, the scanned frame 120 is directly transmitted to the screen 102 having a processing unit. After the processing unit performs the abovementioned recognition and decoding procedure on the frame 120, a current location of the optical scanning device 106 on the displaying medium 104 is also displayed on the frame 120 displayed by the screen 102. After a short while, when the user holds the optical scanning device 106 to move and scan on the displaying medium 104, another frame 120 is fetched and is also processed by the processing unit of the screen 102 to be recognized and decoded.

However, in the abovementioned decoding procedure, a coordinate of each encoding block 122 covered by the frame 120 is retrieved by directly decoding the plurality of microdots 128 of the data region 126; if the user holds the optical scanning device 106 to rapidly move and scan on the displaying medium 104, a significant amount of calculations is brought since the plurality of microdots 128 of the data region 126 have to be instantly recognized and decoded. The significant amount of calculations lead to severe delays on the screen 102 in displaying the movements of the held optical scanning device 106, and bring significant inconveniences to the user.

SUMMARY OF THE INVENTION

The claimed invention discloses a method of determining a coordinate on a micro dotmap according to a moving vector. The method comprises decoding a first coordinate of a first frame corresponding to a first displaying medium according to the first frame retrieved by scanning the first displaying medium at a first moment; calculating a first moving vector according to both the first frame and a second frame at a second moment; and determining a second coordinate of the second frame corresponding to the first displaying medium according to both the first coordinate and the first moving vector. The first displaying medium includes a micro dotmap displayed thereon. The first coordinate indicates a coordinate of a first encoding block on the displayed micro dotmap. The second frame is retrieved by scanning the first displaying medium at the second moment.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
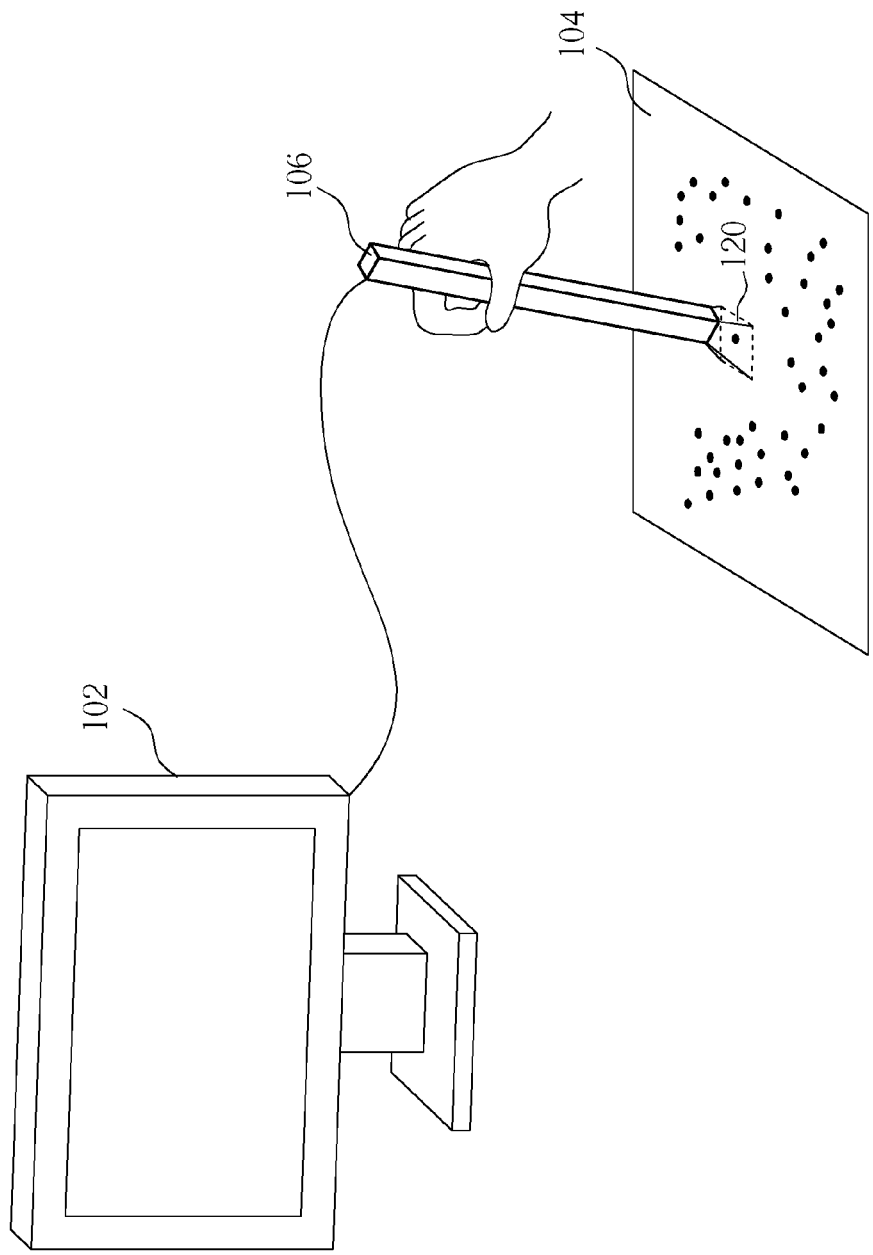
FIG. 1 illustrates scanning a displaying medium printed with a micro dotmap by manipulating an optical scanning device in a hand-writing manner so as to display tracks of the optical scanning device on a screen corresponding to a movement of the optical scanning device on the displaying medium.

For relieving the delays caused by significant amounts of calculations in decoding microdots in the prior art, the present invention discloses a method of determining a coordinate on a micro dotmap with a moving vector for preventing completely and repeatedly recognizing all microdots in a data region, for significantly saving the significant amounts of calculations, and for reducing the delays.

Main characteristics in the disclosed method of the present invention lie in using moving vectors for dynamically calculating according to movements of the held optical scanning device 106 on the displaying medium 104. Since calculating a moving vector is a technique of calculating a relative location, whenever the held optical scanning device 106 fetches frames on the displaying medium 104 at different moments, the plurality of microdots 128 of the data region 126 are not required to be repeatedly recognized to decode a current location of the frame 120. Instead, merely both a location, which is of scanning the displaying medium 104 by the optical scanning device 106 at a first moment, and a moving vector, which is generated according to differences between frames at the first moment and a second moment, are required for calculating a location of scanning the displaying medium 104 by the optical scanning device 106 at the second moment. Moreover, a required amount of calculations are significantly reduced.

Figure 2:
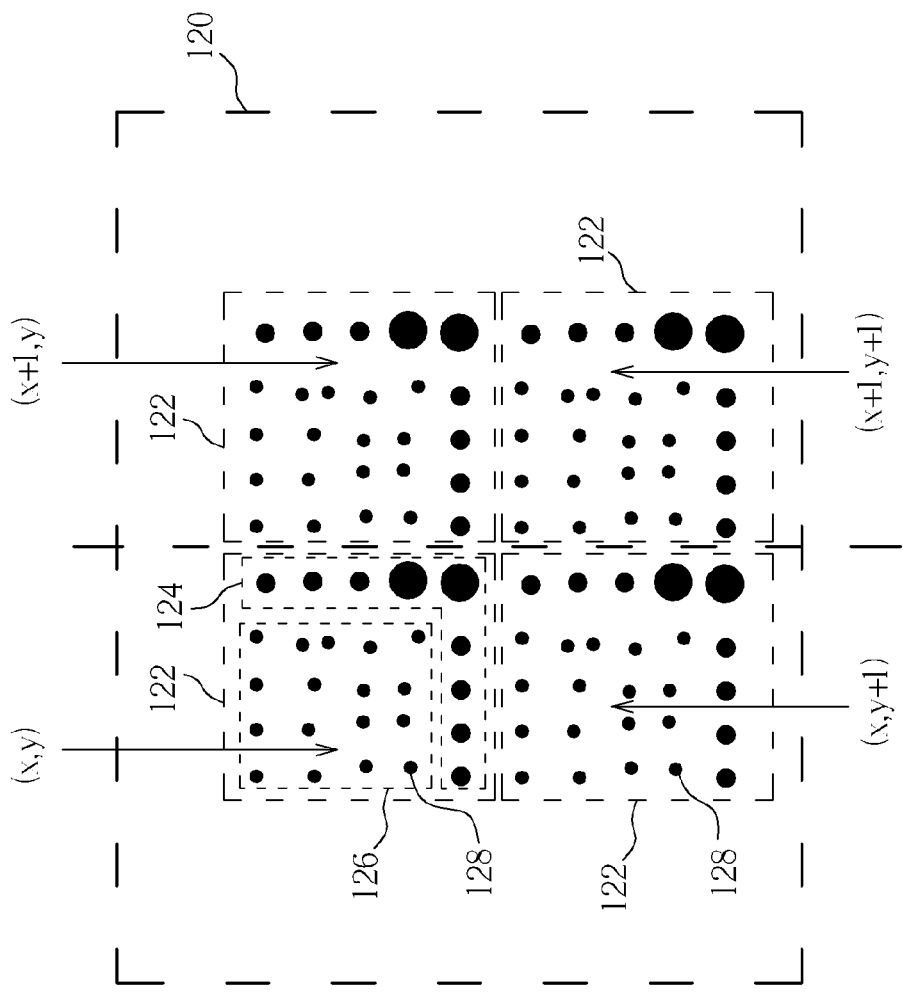
FIG. 2 illustrates a frame retrieved by scanning the displaying medium shown in FIG. 1 with the optical scanning device shown in FIG. 1.
Figure 3:
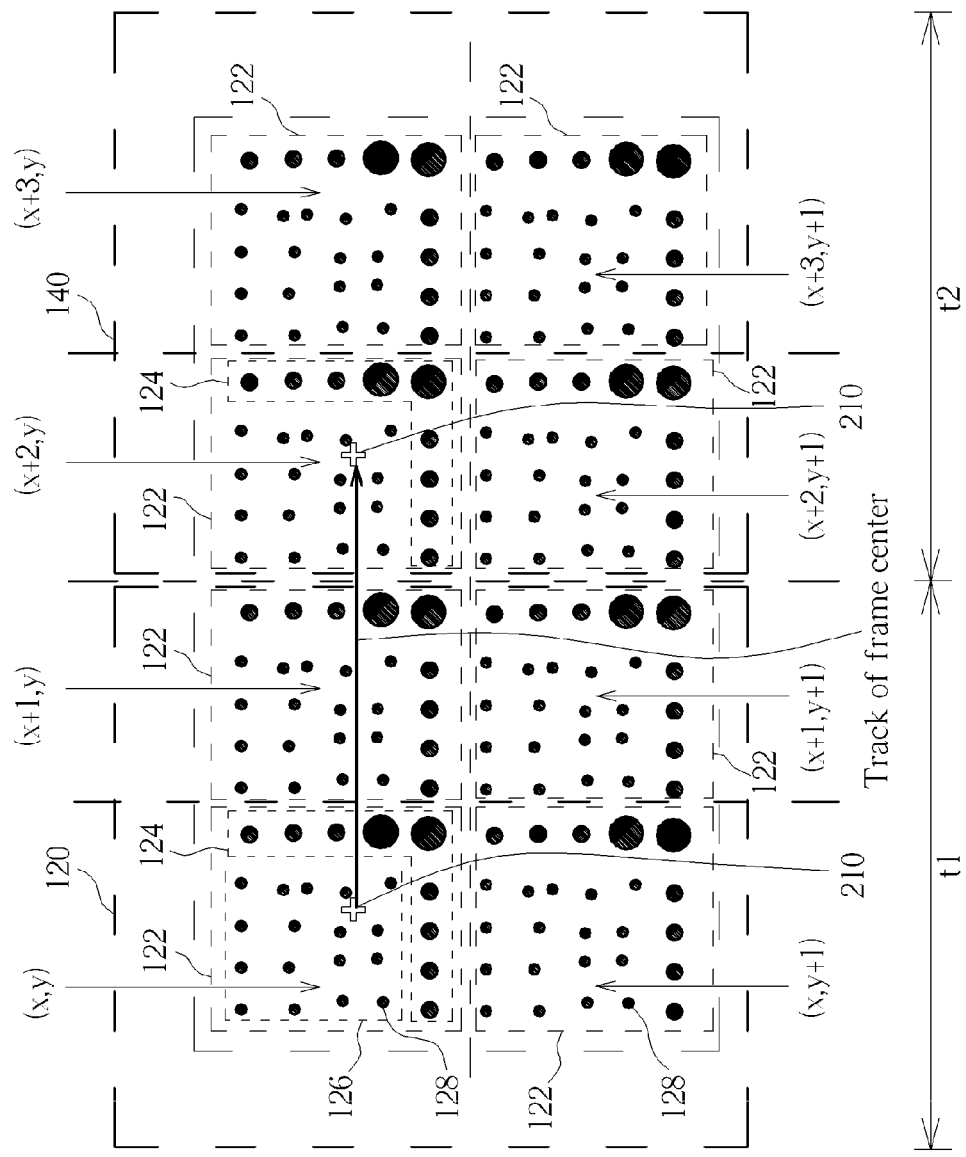
FIG. 3 schematically illustrates an embodiment of calculating a moving vector for calculating a coordinate in the present invention.

Please refer to FIG. 3, which schematically illustrates an embodiment of calculating a moving vector for calculating a coordinate in the present invention. In FIG. 3, a supposition, under which the user holds the optical scanning device 106 shown in FIG. 1 to scan the frame 120 shown in FIG. 2 at a first moment t1, moves the optical scanning device 106 rightward, and then scans a frame 140 at a second moment t2, is made. Note that for clearly describing a track for indicating a movement of the held optical scanning device 106, in FIG. 3, a frame center 210 is used for indicating a benchmark of scanning the frames 120 and 140 by the optical scanning device 106, and a track indicating a movement of the frame center 210 between the first moment t1 and the second moment t2 is used for indicating the track indicating the movement of the held optical scanning device 106 between the first moment t1 and the second moment t2. However, note that the frame center 210 is merely a data structure provided for enhancing the embodiment of the present invention. Therefore, for the user holding the optical scanning device 106 to scan the displaying medium 104, the frame center 210 is not necessarily perceivable or required. Note that for brevity of succeeding descriptions, a coordinate of a micro dotmap printed on the displaying medium 104 is regarded as a coordinate on the displaying medium 104. Moreover, as shown in FIG. 3, the frame 140 covers a plurality of encoding blocks 122 located at coordinates (x+2, y), (x+3, y), (x+2, y+1), and (x+3, y+1).

Figure 4:
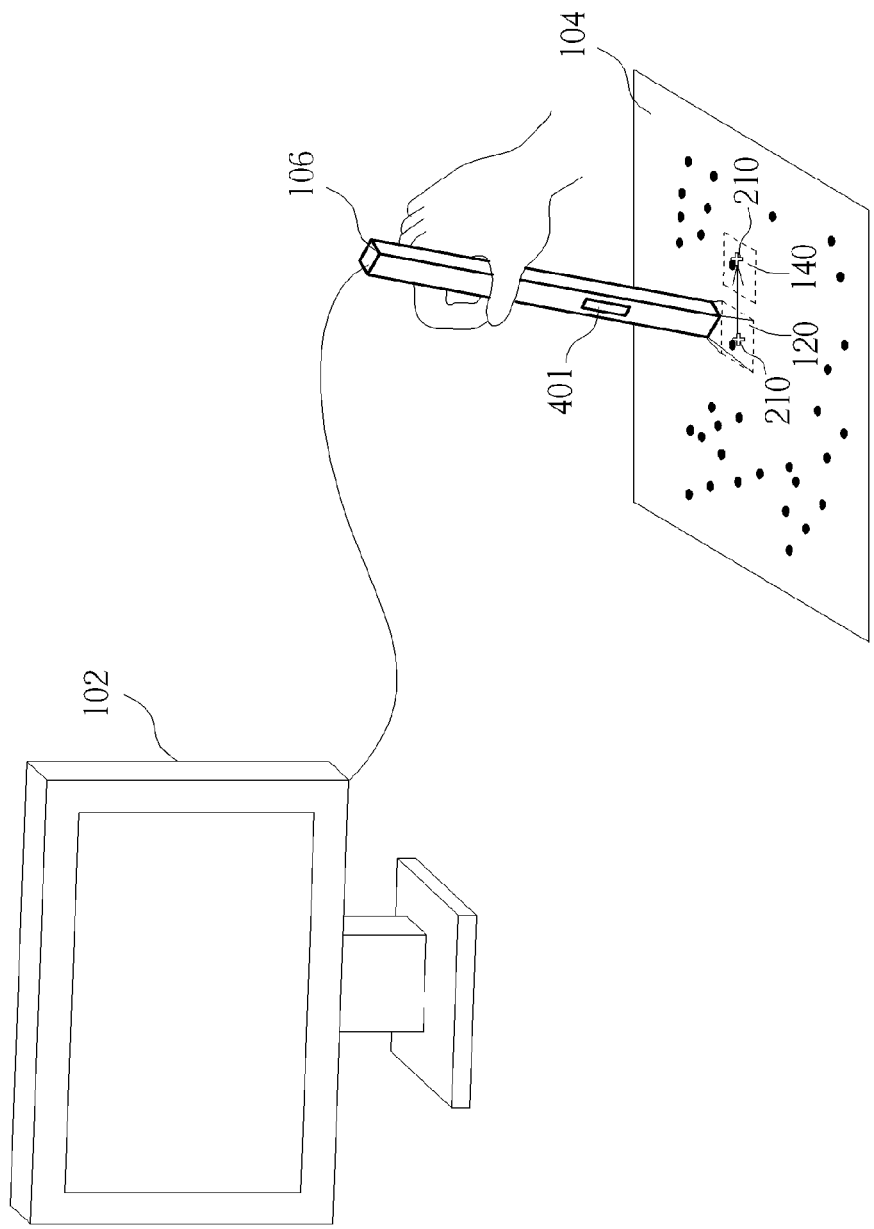
FIG. 4 illustrates a movement of the held optical scanning device shown in FIG. 1 between different moments.

Please refer to FIG. 4, which illustrates a movement of the held optical scanning device 106 shown in FIG. 1 between different moments. In FIG. 4, at the first moment t1, the held optical scanning device 106 scans the displaying medium 104 so as to generate the frame 120. Then from the first moment t1 to the second moment t2, the held optical scanning device 106 is moved on the displaying medium 104 to generate the frame 140.

The disclosed method of the present invention is described as follows, and please refer to both FIG. 3 and FIG. 4. Note that the disclosed method of the present invention is supposed to be implemented on a built-in arithmetic unit 401 included by the optical scanning device 106. However, in other embodiments of the present invention, the disclosed method is not limited to be implemented on the arithmetic unit 401. At the first moment t1, when the held optical scanning device 106 scans the frame 120 shown in FIG. 4, the built-in arithmetic unit 401 of the optical scanning device 106 recognizes an encoding block 122, at which the frame center 210 is currently located, according to locations of different header regions 124 covered by the frame 120 in advance, i.e., the encoding block 122 occupying the coordinate (x, y) and shown in FIG. 3. Then the built-in arithmetic unit 401 of the optical scanning device 106 decodes the plurality of microdots 128 included by the data region 126 of the encoding block 122 occupying the coordinate (x, y) so as to calculate said coordinate (x, y).

Between the first moment t1 and the second moment t2, when the held optical scanning device 106 scans along the track of the frame center 210 shown in FIG. 3 and FIG. 4 and retrieves the frame 140, the built-in arithmetic unit 401 of the optical scanning device 106 calculates a corresponding moving vector according to a movement of the frame center 210 between the first moment t1 and the second moment t2, instead of recognizing a current coordinate (x+2, y) of the frame center 210 in the prior art. Methods of calculating the moving vector include (1) performing characteristic matching on both the frames 120 and 140, and calculating the moving vector according to a result of the characteristic matching; (2) calculating a set of gray level differences between a set of gray levels of the frame 120 and a set of gray levels of the frame 140, and calculating the moving vector according to the set of gray level differences; and (3) calculating an optical flow between the frames 120 and 140, and calculating the moving vector according to the optical flow. The described methods for calculating the moving vector are known by those who skilled in the art so that said methods are not further described for brevity.

After the arithmetic unit 401 perceives the coordinate (x, y) at the first moment t1 and the calculated moving vector between the moments t1 and t2, the coordinate (x+2, y) of the encoding block 122, at which the frame center 210 is located at the second moment t2, may thus be calculated. With the aid of transmissions issued by the optical scanning device 106, the screen 102 displays the movement indicated by a track of the frame center 210 from the coordinate (x, y) to the coordinate (x+2, y). Compared to the prior art, it is beneficial of the disclosed method of the present invention in preventing frequent recognitions and decoding procedures related to each movement of the held optical scanning device 106 on the displaying medium 104. Thereby, significant amounts of calculations are saved, and delays on the screen 102 caused by large amounts of calculations are also reduced.

Figure 5:
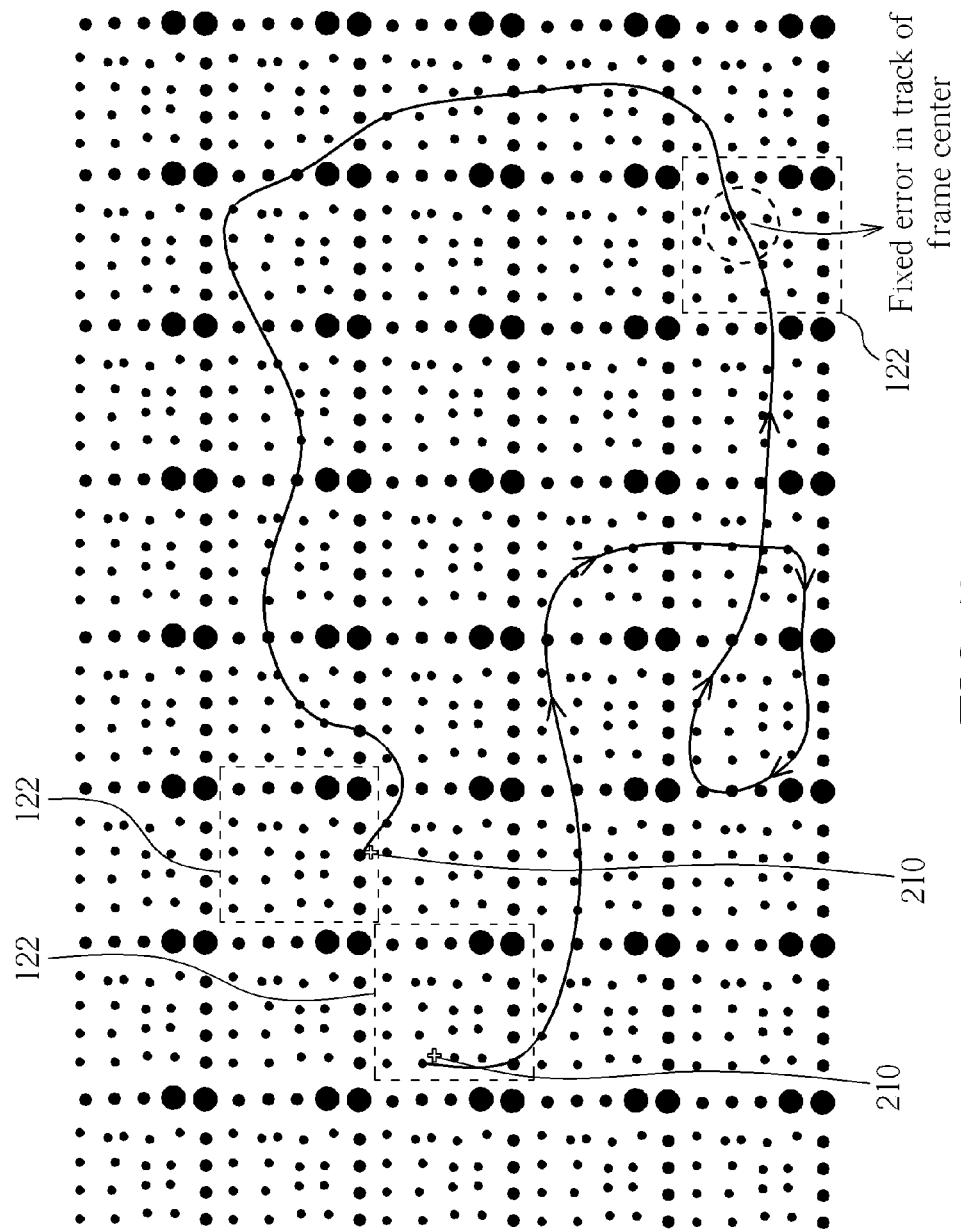
FIG. 5 illustrates applying the method shown in FIG. 3 while the held optical scanning device shown in FIG. 1 moves and scans with a larger range on the displaying medium.

Please refer to FIG. 5, which illustrates applying the method shown in FIG. 3 while the held optical scanning device 106 shown in FIG. 1 moves and scans with a larger range on the displaying medium 104. As shown in FIG. 5, while the held optical scanning device 106 moves and scans with a larger range on the displaying medium 104, by continuously calculating moving vectors, coordinates of the frame center 210 on the displaying medium 104 may also be continuously simulated at different moments, where the directive track shown in FIG. 5 may be regarded as a set formed by a plurality of continuously calculated moving vectors. However, in practical movements of the held optical scanning device 106 on the displaying medium 104, errors may be brought into coordinates determined according to the calculated moving vectors because of vibrations of the displaying medium 104. Besides, such errors may be continuously accumulated while the optical scanning device 106 moves and scans with the larger range on the displaying medium 104 so that errors correspondingly occur in tracks of the frame center 210 on the displaying medium 104 and in movements of the frame center 210 shown on the screen 102. for preventing the abovementioned errors from occurring, in one embodiment of the present invention, the optical scanning device 106 decodes the data region 126 of the encoding block 122, at which the frame center 210 is located, with a variable interval or a constant period so as to determine an accurate and current coordinate of the frame center 210 and to thereby fix the abovementioned accumulated errors. Therefore, errors between the track of the frame center 210 on the displaying medium 104 and the practical movement of said frame center 210 are eliminated as well. Note that the data region 126 may be decoded at any time during the movements of the held optical scanning device 106, and it indicates that while the held optical scanning device 106 is moved, a plurality of coordinates on the micro dotmap (or on the displaying medium 104) may be decoded between certain moments spaced with variable intervals. Similarly, the data region 126 may also be decoded with a fixed period (or a fixed interval) during movements of the held optical scanning device 106, ad it indicates that while the optical scanning device 106 is moved, a plurality of coordinates on the micro dotmap (or the displaying medium 104) are decoded between certain moments spaced with a fixed period or interval. Referring to the embodiment shown in FIG. 5, since there are accumulated errors in the track of the frame center 210, on the regions 122 shown in FIG. 5, locations of the frame center 210 are instantly corrected within the regions 122 with the aid of the abovementioned error-eliminating techniques in the present invention so as to prevent accumulations of the errors in the track of the frame center 210.

Figure 6:
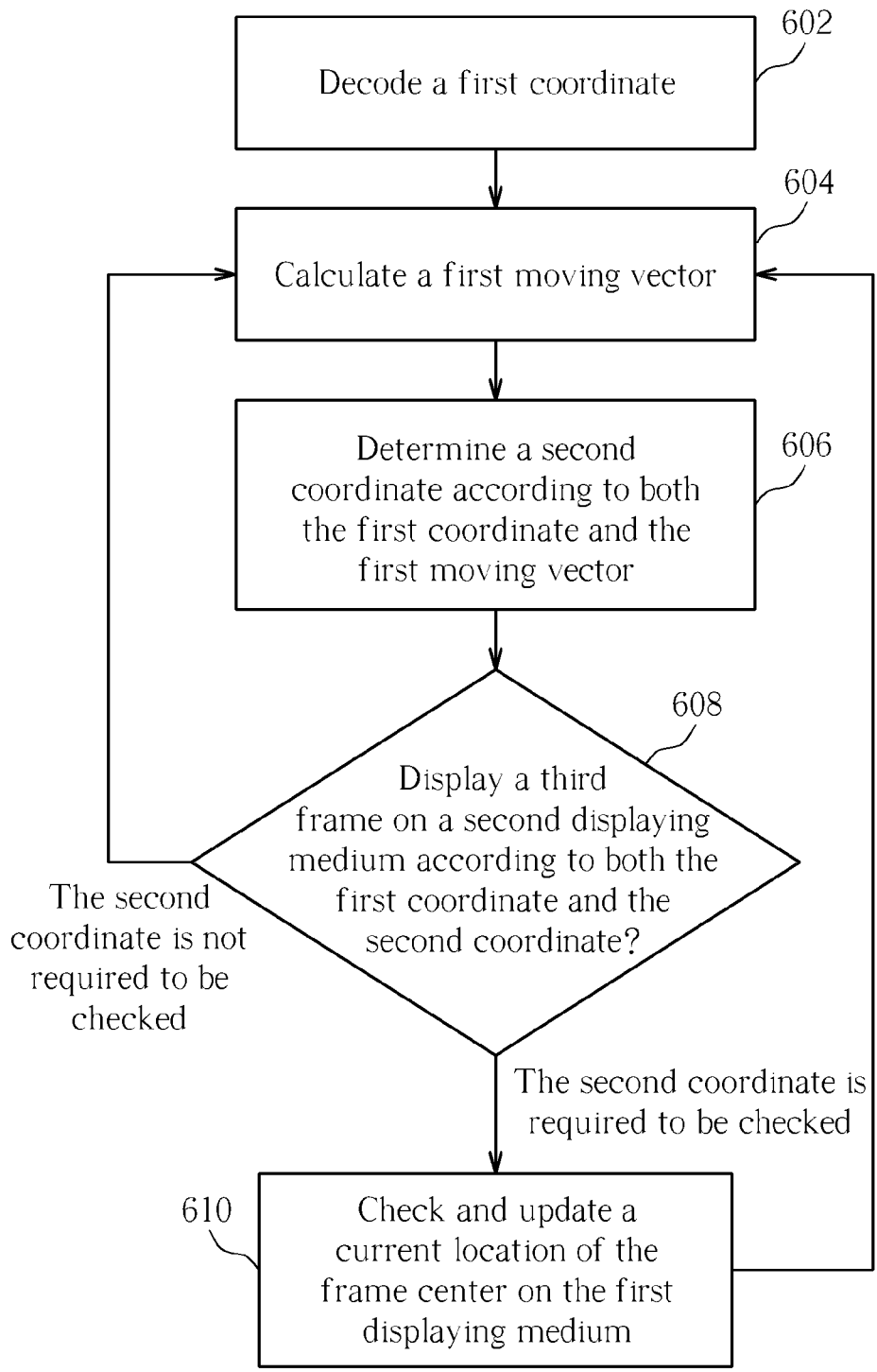
FIG. 6 is a flowchart of the method of determining a coordinate on a micro dotmap by using a moving vector in the present invention.

Please refer to FIG. 6, which is a flowchart of the method of determining a coordinate on a micro dotmap by using a moving vector in the present invention. As shown in FIG. 6, the method includes steps as follows:

Step 602: Decode a first coordinate, which is located on a first displaying medium displaying a micro dotmap and is of a frame center of a first frame, where the first frame is retrieved by scanning the first displaying medium at a first moment;

Step 604: Calculate a first moving vector according to both the first frame and a second frame, which is corresponding to a current location of the frame center at a second moment succeeding to the first moment, at the second moment, where the first moving vector is corresponding to a movement of the frame center between the first moment and the second moment;

Step 606: Determine a second coordinate of the frame center on the first displaying medium according to both the first coordinate and the first moving vector at the second moment;

Step 608: Display a third frame on a second displaying medium according to both the first coordinate and the second coordinate; when the second frame is required to be decoded for checking the second coordinate, go to Step 610; else, go to Step 604; and Step 610: Check and update a current location of the frame center on the first displaying medium according to a result of decoding the second frame.

Steps shown in FIG. 6 is a simplified summary of the disclosed method of the present invention. In Step 602, a coordinate of an encoding block 122, at which the frame center 210 is currently located, is calculated according to a frame 120 currently corresponding to the frame center 210 on the displaying medium 104 at the first moment t1. In Step 604, a moving vector between the frames 120 and 140 is calculated according to characteristic differences between the frames 120 and 140 at the second moment t2 with the aid of the abovementioned techniques including the characteristic matching, gray level differences, and the optical flow, while the frame center 210 moves and the frame 140 is thereby retrieved. In Step 606, a coordinate of an encoding block 122, at which the frame center 210 is located at the second moment t2, is calculated according to both the coordinate determined in Step 602 and the moving vector calculated in Step 604. In Step 608, a track corresponding to a movement of the frame center 210 between the first moment t1 and the second moment t2 is displayed on the screen 102 according to the coordinate calculated in Step 606. For preventing the accumulated errors, at certain moments, some coordinates calculated according to Step 606 have to be checked in their accuracies, where the certain moments are spaced with a fixed period or a variable interval. The check includes decoding a data region 126 of the encoding block 122, at which the frame center 210 is located at the second moment t2, so as to check whether the coordinated calculated in Step 606 is correct. When there are errors in the coordinate calculated in Step 606, the coordinate of the frame center 210 at the second moment t2 is instantly updated by a coordinate calculated by decoding in Step 610. After the update is complete, Step 604 is run again; and when the Step 606 is run again, the first coordinate used in Step 606 is just the coordinate used for updating as mentioned above. Besides, in Step 608, when the coordinate of the frame center 210 is not required to be checked anymore, go to Step 604; after a while when Step 606 is run again, the first coordinate used in Step 606 is just the second coordinate calculated in a previous-adjacent run of Step 606. As shown in FIG. 6, an implicit recursive procedure related to Step 604, 606, 608, and 610 is continuously run along with movements of the held optical scanning device 106. Even if the held optical scanning device 106 stays at a same position for a while, the disclosed method of the present invention is still available.

Figure 7:
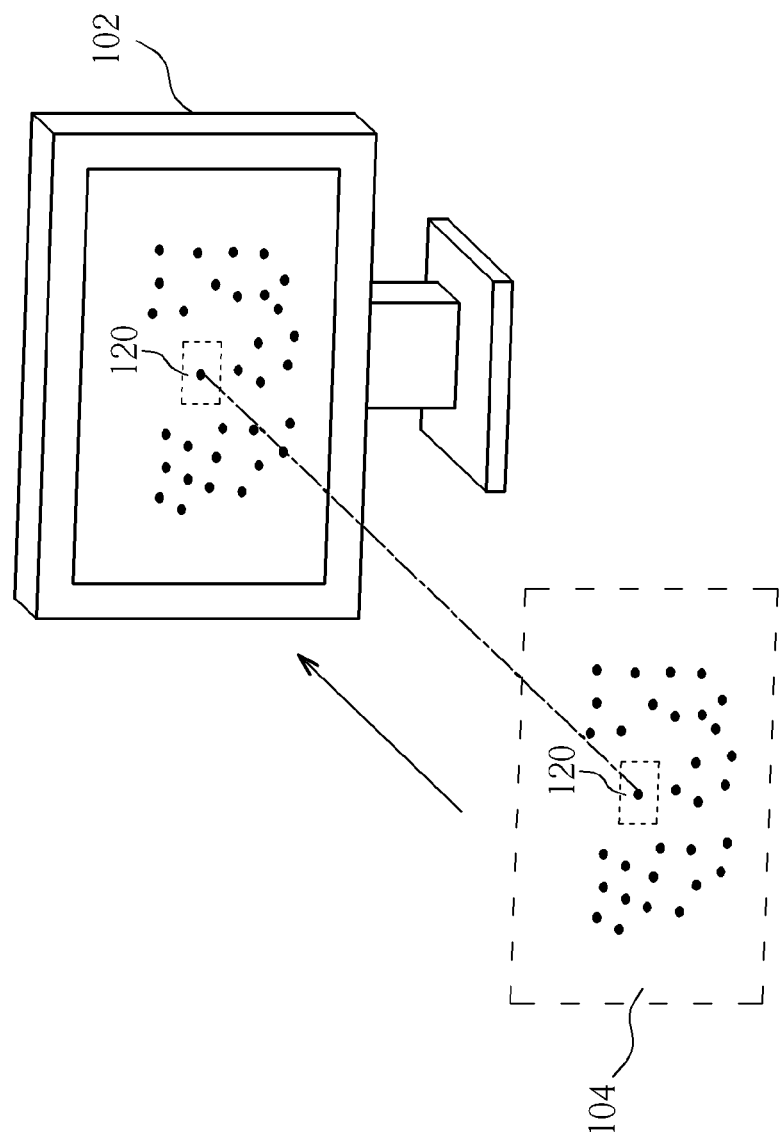
FIG. 7 illustrates using a transparent or black displaying medium and white microdots on a liquid crystal display (LCD) for encoding microdots in a similar manner with FIG. 1.

In FIG. 1, the displaying medium 104 is colored in white to serve as a background, and may be printed with black microdots for indicating both the micro dotmap and the microdots illustrated in the above diagrams so as to implement the disclosed method of the present invention, where the displaying medium 104 may be implemented with an electronic displaying device or an electronic paper. However, the microdots may also be printed with inks corresponding to various wavelengths in lights so as to match displaying media made of various materials or to match other types of microdot representations in other embodiments of the present invention. Please refer to FIG. 7, which illustrates using a transparent or black displaying medium and white microdots on a liquid crystal display (LCD) for encoding microdots in a similar manner with FIG. 1. On a conventional touch-triggered LCD, for preventing light reflection, a display panel of the LCD may be made of certain materials capable of absorbing visible lights. When the display panel is implemented with the disclosed method of the present invention, as shown in FIG. 7, the displaying medium 104 may be implemented with transparent materials, such as a slide; paints or inks capable of reflecting lights may be used for printing microdots on the displaying medium 104; and the displaying medium 104 may be attached to the screen 102 implemented with a LCD. Therefore, the disclosed method of the present invention may thus be applied on the touch-triggered LCD. When the held optical scanning device 106 scans the displaying medium 104 attached to the screen 102, locations of microdots on the displaying medium 104 may be substantially perceived by detecting lights reflected by the microdots with the aid of the disclosed method of the present invention. Note that as long as wavelengths of visible lights or invisible lights absorbed by inks or paints for printing the displaying medium and the microdots are not overlapped with or close to each other so that the microdots can be clearly differentiated from the displaying medium while scanning the displaying medium, feasible replacements of both the microdots and the displaying medium or applications related to the feasible replacements should not be limited in embodiments of the present invention. Furthermore, replacing inks or paints printed on the microdots and displaying medium with materials capable of absorbing visible lights or invisible lights of various wavelength domains are allowed in embodiments of the present invention as long as the abovementioned conditions related to respective wavelength domains are reached.

Note that the displaying medium 104 may be an electronic displaying device. The micro dotmap of the displaying medium 104 may be printed on a transparent plate with paints or inks. And the transparent plate may be disposed above the electronic displaying device. Also, the micro dotmap of the displaying medium 104 may be printed on the electronic displaying device.

The present invention discloses a method of determining a coordinate on a displaying medium printed with a micro dotmap by using a moving vector. With the aid of the disclosed method, when a held optical scanning device moves and scans on the displaying medium, required calculations for generating the moving vector are significantly fewer in the present invention in comparison to the amount of calculations brought by frequently decoding the data region of each encoding block on the micro dotmap in the prior art. Therefore, delays of the screen displaying a frame are also significantly reduced while the optical scanning device frequently moves and scans the displaying medium.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of determining a coordinate on a micro dotmap according to a moving vector, comprising:
   decoding a first coordinate of a first frame corresponding to a first displaying medium according to the first frame retrieved by scanning the first displaying medium at a first moment, the first displaying medium including a micro dotmap displayed thereon, and the first coordinate indicates a coordinate of a first encoding block on the displayed micro dotmap;
   scanning the first displaying medium at a second moment to retrieve a second frame, wherein the second moment is later than the first moment;
   calculating a first moving vector according to at least one difference between the first frame and the second frame; and
   determining a second coordinate of the second frame corresponding to the first displaying medium according to both the first coordinate and the first moving vector;
   wherein the first displaying medium is an electronic displaying device, the micro dotmap is printed on a transparent plate with paints or inks, and the transparent plate is disposed above a displaying panel comprised by the electronic displaying device.

2. The method of claim 1 wherein the second coordinate is a coordinate of a second encoding block located on the micro dotmap.

3. The method of claim 2 wherein each of the first encoding block and the second encoding block comprises a plurality of micro dots displayed with different permutations or combinations.

4. The method of claim 2 wherein each of the first encoding block and the second encoding block is separated into a header region and a data region; the header region is used for recognizing an encoding block having said header region; and the data region is used for indicating a coordinate of an encoding block having said data region on the first displaying medium.

5. The method of claim 1 wherein decoding the first coordinate comprising:
   decoding the first coordinate according to the first encoding block on the first displaying medium, to which a frame center of the first frame is corresponding at the first moment.

6. The method of claim 1 wherein calculating the first moving vector according to the at least one difference between the first frame and the second frame comprising:
   calculating the first moving vector according to a difference between a frame center of the first frame and a frame center of the second frame at the second moment.

7. The method of claim 1 further comprising:
   displaying a third frame on a second displaying medium according to both the first coordinate and the second coordinate;
   wherein the third frame is corresponding to a movement between the first moment and the second moment while scanning the first displaying medium.

8. The method of claim 7 wherein the second displaying medium is an electronic displaying device capable of displaying the third frame according to the micro dotmap, the second displaying medium displays a location of a frame center corresponding to the second displaying medium on the third frame, and the frame center is of the first frame or the second frame on the first displaying medium.

9. The method of claim 8 wherein both the first frame and the second frame are retrieved by scanning the micro dotmap on the first displaying medium with the aid of an optical scanning device, the optical scanning device comprises an arithmetic unit, which is capable of calculating the first moving vector according to both the first frame and the second frame.

10. The method of claim 8 wherein the second displaying medium comprises an arithmetic unit, which is capable of calculating the first moving vector according to both the first frame and the second frame.

11. The method of claim 1 wherein the micro dotmap comprises a plurality of encoding blocks, an plurality of micro dots on a header region comprised by each of the plurality of encoding blocks have a same combination or a same permutation.

12. The method of claim 1 wherein the micro dotmap comprises a plurality of encoding blocks, a permutation or a combination of a plurality of micro dots on a data region comprised by each of the plurality of encoding blocks is implemented according to an encoding method and is used for indicating a coordinate of the encoding block having the data region on the micro dotmap.

13. The method of claim 1 further comprising:
  decoding a plurality of coordinates according to a plurality of frames, which are retrieved by scanning the first displaying medium at a plurality of moments succeeding to the first moment; and
  checking and updating a location of a frame center of each of the plurality of frames on the first displaying medium at the plurality of moments according to the plurality of decoded coordinates.

14. The method of claim 13 wherein the plurality of moments are spaced with a constant period.

15. The method of claim 13 wherein the plurality of moments are spaced with a variable interval.

16. The method of claim 1 wherein the first displaying medium is a printable medium printed with the micro dotmap.

17. The method of claim 16 wherein both the first frame and the second frame are retrieved by scanning the micro dotmap on the first displaying medium with the aid of an optical scanning device.

18. The method of claim 1 wherein calculating the first moving vector according to the at least one difference between the first frame and the second frame comprises:
  calculating a set of gray level differences between a first set of gray levels of the first frame and a second set of gray levels of the second frame; and
  calculating the first moving vector according to the calculated set of gray level differences.

19. The method of claim 1 wherein calculating the first moving vector according to the at least one difference between the first frame and the second frame comprises:
  performing characteristic matching between the first frame and the second frame to generate a characteristic matching result; and
  calculating the first moving vector according to the generated characteristic matching result.

20. The method of claim 1 wherein calculating the first moving vector according to the at least one difference between the first frame and the second frame comprises:
  calculating an optical flow between the first frame and the second frame; and
  calculating the first moving vector according to the calculated optical flow.

21. The method of claim 1 further comprising:
  scanning the first displaying medium at a third moment succeeding to the second moment to retrieve a fourth frame;
  calculating a second moving vector on the first displaying medium and corresponding to a movement between frame centers of the second frame and the fourth frame; and
  determining a coordinate of the frame center of the fourth frame on the first displaying medium according to both the second coordinate and the second moving vector at the third moment.

22. A method of determining a coordinate on a micro dotmap according to a moving vector, comprising:
  decoding a first coordinate of a first frame corresponding to a first displaying medium according to the first frame retrieved by scanning the first displaying medium at a first moment, the first displaying medium including a micro dotmap displayed thereon, and the first coordinate indicates a coordinate of a first encoding block on the displayed micro dotmap;
  scanning the first displaying medium at a second moment to retrieve a second frame, wherein the second moment is later than the first moment;
  calculating a first moving vector according to at least one difference between the first frame and the second frame; and
  determining a second coordinate of the second frame corresponding to the first displaying medium according to both the first coordinate and the first moving vector, without via decoding the second frame;
  wherein the first displaying medium is an electronic displaying device, the micro dotmap is printed on a transparent plate with paints or inks, and the transparent plate is disposed above a displaying panel comprised by the electronic displaying device.

23. A method of determining a coordinate on a micro dotmap according to a moving vector, comprising:
  decoding a first coordinate of a first frame corresponding to a first displaying medium according to the first frame retrieved by scanning the first displaying medium at a first moment, the first displaying medium including a micro dotmap displayed thereon, and the first coordinate indicates a coordinate of a first encoding block on the displayed micro dotmap;
  scanning the first displaying medium at a second moment to retrieve a second frame, wherein the second moment is later than the first moment;
  calculating a first moving vector according to at least one difference between the first frame and the second frame; and
  determining a second coordinate of the second frame corresponding to the first displaying medium according to both the first coordinate and the first moving vector;
  wherein the first displaying medium is an electronic displaying device, the micro dotmap is printed on the electronic displaying device.

* * * * *